US011187637B2

(12) United States Patent
Yamahira et al.

(10) Patent No.: US 11,187,637 B2
(45) Date of Patent: Nov. 30, 2021

(54) PARTICLE SIZE DISTRIBUTION MEASUREMENT APPARATUS AND PARTICLE SIZE DISTRIBUTION MEASUREMENT METHOD

(71) Applicant: JFE STEEL CORPORATION, Tokyo (JP)

(72) Inventors: Naoshi Yamahira, Tokyo (JP); Toshiki Tsuboi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 17/042,044

(22) PCT Filed: Mar. 19, 2019

(86) PCT No.: PCT/JP2019/011533
§ 371 (c)(1),
(2) Date: Sep. 25, 2020

(87) PCT Pub. No.: WO2019/193971
PCT Pub. Date: Oct. 10, 2019

(65) Prior Publication Data
US 2021/0018418 A1     Jan. 21, 2021

(30) Foreign Application Priority Data

Apr. 3, 2018    (JP) .............................. JP2018-071681

(51) Int. Cl.
*G01N 15/02* (2006.01)
*G01N 21/25* (2006.01)
(Continued)

(52) U.S. Cl.
CPC ..... *G01N 15/0205* (2013.01); *G01N 15/0227* (2013.01); *G01N 21/255* (2013.01);
(Continued)

(58) Field of Classification Search
CPC .......... G01N 15/0205; G01N 15/0227; G01N 21/27; G01N 21/255; G01N 21/3563; G01N 21/55
See application file for complete search history.

(56) References Cited

U.S. PATENT DOCUMENTS

2002/0084172 A1*   7/2002  Toms ................. G01N 15/1475
                                                              198/445
2015/0307785 A1*  10/2015  Dohi ....................... C10B 53/04
                                                              44/607
2019/0370953 A1   12/2019  Yamahira et al.

FOREIGN PATENT DOCUMENTS

CN          106521066 A       3/2017
EP          3605064 A1        2/2020
(Continued)

OTHER PUBLICATIONS

English machine translation of Katayama JP 2014062875A (Year: 2014).*
English machine translation of Hirata JP 2015124436A (Year: 2015).*

(Continued)

Primary Examiner — Dominic J Bologna
(74) Attorney, Agent, or Firm — Oliff PLC

(57) ABSTRACT

A particle size distribution measurement apparatus includes a coarse grain measurement device that acquires information indicating distribution of coarse grains, an adherent powder measurement device that acquires information indicating distribution of adherent powder, and a computation device that calculates distribution of a raw material. The computation device includes a coarse grain particle size distribution calculation unit configured to calculate the distribution of the coarse grains on the basis of the information acquired by the coarse grain measurement device, an adherent powder particle size distribution calculation unit configured to calculate the particle size distribution of the adherent powder on the basis of the information acquired by the adherent (Continued)

powder measurement device, and a raw material particle size distribution calculation unit configured to calculate the particle size distribution of the raw material on the basis of the distribution calculated by the coarse grain and adherent powder particle size distribution calculation units.

20 Claims, 9 Drawing Sheets

(51) Int. Cl.
    *G01N 21/3563*    (2014.01)
    *G01N 21/55*    (2014.01)
    *G01N 21/27*    (2006.01)

(52) U.S. Cl.
    CPC ......... *G01N 21/27* (2013.01); *G01N 21/3563* (2013.01); *G01N 21/55* (2013.01)

(56) References Cited

FOREIGN PATENT DOCUMENTS

| | | | |
|---|---|---|---|
| JP | 04036422 A | * | 2/1992 |
| JP | H05-164677 A | | 6/1993 |
| JP | 2008-046077 A | | 2/2008 |
| JP | 2009-299092 A | | 12/2009 |
| JP | 2014-062875 A | | 4/2014 |
| JP | 2014-092494 A | | 5/2014 |
| JP | 2015-124436 A | | 7/2015 |
| WO | 2018/101287 A1 | | 6/2018 |
| WO | 2018/181942 A1 | | 10/2018 |

OTHER PUBLICATIONS

May 21, 2019 International Search Report issued in International Patent Application No. PCT/JP2019/011533.
Apr. 12, 2021 Extended Search Report issued in European Patent Application No. 19781199.5.

* cited by examiner

PARTICLE SIZE DISTRIBUTION MEASUREMENT APPARATUS AND PARTICLE SIZE DISTRIBUTION MEASUREMENT METHOD

TECHNICAL FIELD

The present invention relates to a particle size distribution measurement apparatus and a particle size distribution measurement method for measuring a particle size distribution of a raw material for use in a blast furnace or the like.

BACKGROUND ART

In a manufacturing process such as a blast furnace using a raw material such as a mineral, ventilation in the furnace is one of important indicators in the manufacturing process, in which one factor that influences the ventilation in the furnace is a particle size distribution of the raw material. The particle size distribution of a raw material has conventionally been grasped by regular sampling and sieving analysis of the raw material. However, since sieving analysis is time-consuming, it is difficult to reflect real-time results to blast furnace operation. Accordingly, there has been a desire for a technology for grasping in real time the particle size distribution of a raw material that is conveyed to a blast furnace.

As a conventional method for measuring the particle size distribution of a raw material in real time, a method is known that observes an image or a shape of an upper portion of the raw material on a conveyor by using a camera or a laser range finder.

For example, PTL 1 discloses a particle diameter measurement apparatus and a particle diameter measurement method for measuring a particle size distribution of a granular raw material through image processing of image data of the granular raw material captured on a conveyor.

Additionally, PTL 2 discloses a blast furnace burden detector that detects a powder rate of a burden by using spectroscopic information obtained by dispersing near-infrared reflected light from the burden on a conveyor

CITATION LIST

Patent Literature

PTL 1: JP 2014-92494 A
PTL 2: JP 2015-124436 A

SUMMARY OF INVENTION

Technical Problems

However, although the particle diameter measurement apparatus and the particle diameter measurement method disclosed in PTL 1 can measure in real time the particle size distribution of the granular raw material, they use a single camera and a single laser range finder. Thus, due to the limitation of resolution of these sensors, it is impossible to measure with high accuracy the particle size distribution of adherent powder (fine particles having significantly small particle diameters) adhering to coarse grains of the raw material.

In addition, the blast furnace burden detector disclosed in PTL 2 is an apparatus that measures the powder rate of the burden by detecting an amount of a water content in the burden. However, what is highly correlated with water content is the powder rate of a burden small in particle size adhering via moisture, and the particle size of a burden of coarse grains large in particle size cannot be measured with high accuracy.

Accordingly, the present invention has been made to solve the above conventional problems, and it is an object of the present invention to provide a particle size distribution measurement apparatus and a particle size distribution measurement method capable of measuring with high accuracy the particle size distribution of a raw material including coarse grains and adherent powder adhering to the coarse grains.

Solution to Problems

To achieve the above object, a particle size distribution measurement apparatus according to an aspect of the present invention is a particle size distribution measurement apparatus for measuring a particle size distribution of a raw material including coarse grains and adherent powder adhering to the coarse grains, the apparatus including a coarse grain measurement device configured to acquire information indicating a particle size distribution of the coarse grains, an adherent powder measurement device configured to acquire information indicating a particle size distribution of the adherent powder, and a computation device configured to calculate the particle size distribution of the raw material, in which the computation device includes a coarse grain particle size distribution calculation unit configured to calculate the particle size distribution of the coarse grains on a basis of the information indicating the particle size distribution of the coarse grains acquired by the coarse grain measurement device, an adherent powder particle size distribution calculation unit configured to calculate the particle size distribution of the adherent powder on a basis of the information indicating the particle size distribution of the adherent powder acquired by the adherent powder measurement device, and a raw material particle size distribution calculation unit configured to calculate the particle size distribution of the raw material on a basis of the particle size distribution of the coarse grains calculated by the coarse grain particle size distribution calculation unit and the particle size distribution of the adherent powder calculated by the adherent powder particle size distribution calculation unit.

Additionally, a particle size distribution measurement method according to another aspect of the present invention is a particle size distribution measurement method for measuring a particle size distribution of a raw material including coarse grains and adherent powder adhering to the coarse grains, the method including a coarse grain measurement step of acquiring information indicating a particle size distribution of the coarse grains by a coarse grain measurement device, an adherent powder measurement step of acquiring information indicating a particle size distribution of the adherent powder by an adherent powder measurement device, and a computation step of calculating the particle size distribution of the raw material by a computation device, wherein the computation step includes a coarse grain particle size distribution calculation step of calculating the particle size distribution of the coarse grains on a basis of the information indicating the particle size distribution of the coarse grains acquired at the coarse grain measurement step, an adherent powder particle size distribution calculation step of calculating the particle size distribution of the adherent powder on a basis of the information indicating the particle size distribution of the adherent powder acquired at the adherent powder measurement step, and a raw material particle size distribution calculation step of calculating the particle size distribution of the raw material on a basis of the particle size distribution of the coarse grains calculated at the coarse grain particle size distribution calculation step and the particle size distribution of the adherent powder calculated at the adherent powder particle size distribution calculation step.

Advantageous Effects of Invention

According to the particle size distribution measurement apparatus and the particle size distribution measurement method according to the present invention, there can be provided a particle size distribution measurement apparatus and a particle size distribution measurement method capable of measuring with high accuracy the particle size distribution of a raw material including coarse grains and adherent powder adhering to the coarse grains.

DESCRIPTION OF EMBODIMENTS

Hereinafter, an embodiment of the present invention will be described with reference to the drawings. The embodiment is an example of measuring a particle size distribution of coke that is one of blast furnace raw materials conveyed by a conveyor in a manufacturing process using a blast furnace.

It should be noted that the drawings are schematic, and dimensional relationships between respective elements, ratios between the respective elements, and the like may be different from actual ones. Additionally, there may be some portions different in dimensional relationships and ratios between the drawings.

Figure 1:
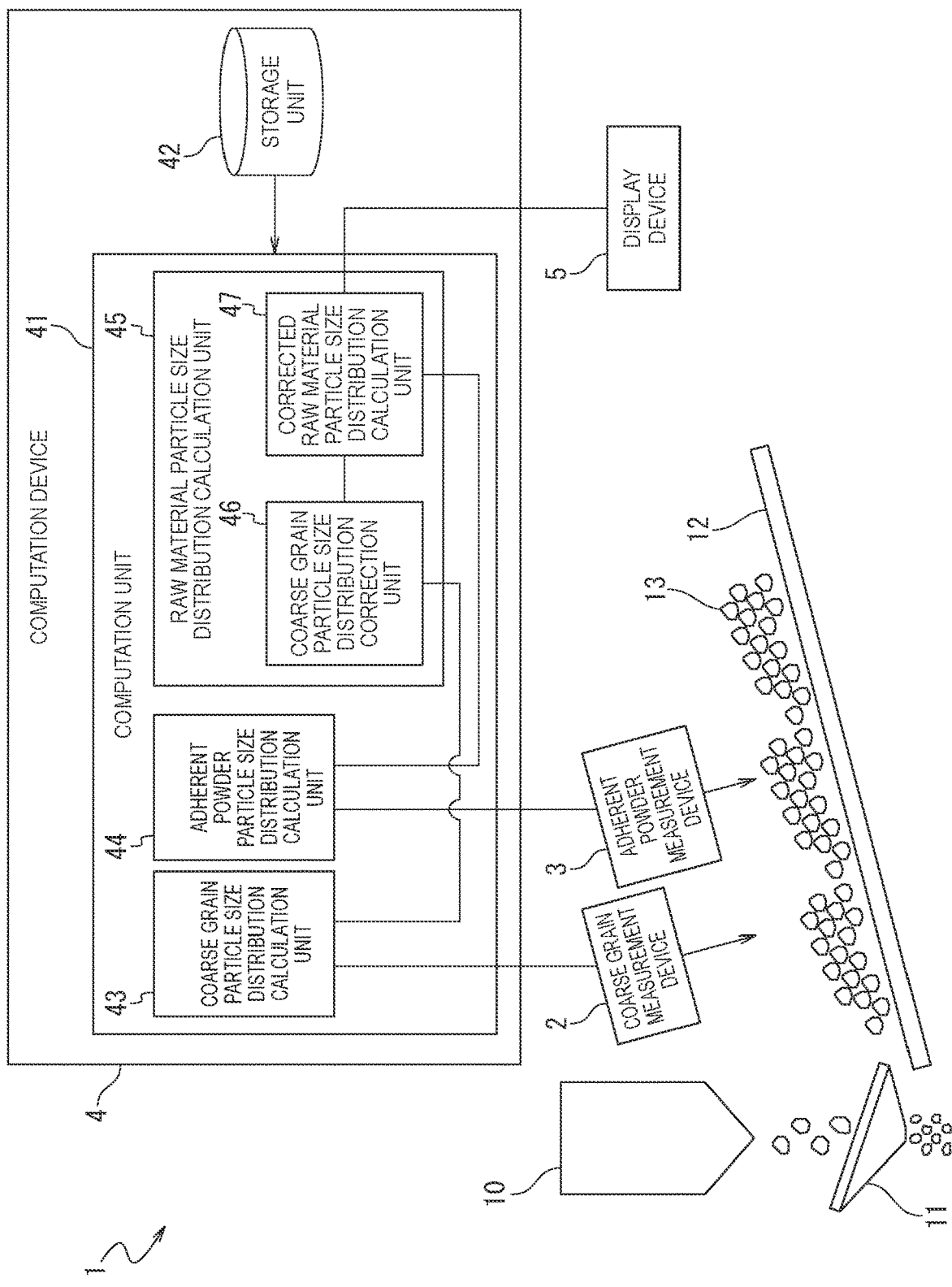
FIG. 1 is a schematic diagram illustrating a schematic structure of a particle size distribution measurement apparatus according to an embodiment of the present invention and a periphery thereof.

First, FIG. 1 illustrates a schematic structure of a particle size distribution measurement apparatus according to an embodiment of the present invention and a periphery thereof, in which a coke 13 to be charged into a blast furnace (unillustrated) is first stored in a hopper 10. Then, the coke 13 discharged from the hopper 10 is sieved through a sieve 11 to remove fine particles smaller than a mesh size of the sieve 11, and then conveyed to the blast furnace by a conveyor 12. The blast furnace is an example of a container.

Here, due to time-limited sieving with the sieve 11, the coke 13 transferred to the conveyor 12 side also includes adherent powder equal to or smaller than the mesh size of the sieve 11, which has not been completely sieved through the sieve 11 and has adhered to coarse grains larger than the mesh size. Therefore, the coke 13 that is conveyed by the conveyor 12 includes the coarse grains larger than the mesh size of the sieve 11 and the adherent powder adhering to the coarse grains, which has not been completely sieved through the sieve 11 and which is equal to or smaller than the mesh size. Note that, in the present embodiment, the mesh size of the sieve 11 is, for example, 35 mm.

A particle size distribution measurement apparatus 1 measures a particle size distribution of the coke (raw material) 13 including the coarse grains on the conveyor 12 and the adherent powder adhering to the coarse grains, and includes a coarse grain measurement device 2, an adherent powder measurement device 3, and a computation device 4.

Here, the coarse grain measurement device 2 is arranged above the conveyor 12 and acquires in real time information indicating a particle size distribution of the coarse grains included in the coke 13 conveyed by the conveyor 12.

The coarse grain measurement device 2 in the present embodiment is formed by a laser range finder. The laser range finder measures in real time a distance from the laser range finder to the coke 13 on the conveyor 12, and acquires profile data of the coke 13 that is the distance from the laser range finder to the coke 13 as information indicating the particle size distribution of the coarse grains. The laser range finder outputs the profile data of the coke 13 to the computation device 4. Note that preferably the laser range finder has a measurement region that is the same in width as a width of the conveyor 12, and can measure all pieces of the coke 13 conveyed by the conveyor 12. The laser range finder measures the coke 13 conveyed by the conveyor 12 at a speed of, for example, 1000 to 10000 lines/second, and arranges the measured linear data in a time direction to obtain the profile data of the coke 13.

In addition, the adherent powder measurement device 3 is arranged above the conveyor 12 and on a downstream side of the coarse grain measurement device 2, and acquires in real time information indicating a particle size distribution of the adherent powder adhering to the coarse grains of the coke 13 conveyed by the conveyor 12.

The adherent powder measurement device 3 in the present embodiment is an image capturing device, and is formed by, for example, a digital camera with strobe light. The digital camera captures an image of the coke 13 at previously determined time intervals, and acquires in real time image data of the coke 13 as information indicating the particle size distribution of the adherent powder. The digital camera outputs the image data to the computation device 4. An image capturing sensor such as a CCD or CMOS sensor included in the digital camera captures the image of the coke 13 to generate the image data.

Note that, as the adherent powder measurement device 3, a spectroscopic device may be used that includes a spectroscopic measurement unit configured to measure spectral reflectance by dispersing reflected light from the coke 13. In this case, the spectroscopic device acquires in real time a spectral reflectance at an absorption wavelength of water and spectral reflectances at two wavelengths sandwiching the wavelength that are not absorption wavelengths of water, as the information indicating the particle size distribution of the adherent powder. The spectroscopic device acquires the spectral reflectances at a speed of, for example, 1 measurement per second or more, and outputs the spectral reflectances at the three wavelengths to the computation device 4.

Additionally, when using, as the adherent powder measurement device 3, the spectroscopic device including the spectroscopic measurement unit configured to measure spectral reflectance by dispersing reflected light from the coke 13, the spectroscopic device may acquire in real time spectral reflectances at nine wavelengths in a visible light region and an infrared region as the information indicating the particle size distribution of the adherent powder. In this case, the wavelengths of the spectral reflectances acquired by the spectroscopic device are, for example, blue, green, red, 1.32 µm, 1.46 µm, 1.60 µm, 1.80 µm, 1.96 µm, and 2.10 µm, from a short wavelength side. The spectroscopic device outputs the spectral reflectances at the nine wavelengths to the computation device 4. Note that blue is a filter that allows light having a wavelength ranging at least from 435 to 480 nm to pass therethrough; green is a filter that allows light having a wavelength ranging at least from 500 to 560 nm to pass therethrough; and red is a filter that allows light having a wavelength ranging at least from 610 to 750 nm to pass therethrough.

Next, the computation device 4 calculates the particle size distribution of the coke (raw material), and is a general-purpose computer such as a work station or a personal computer, which includes a computation unit 41 and a storage unit 42.

The computation unit 41 includes a coarse grain particle size distribution calculation unit 43, an adherent powder particle size distribution calculation unit 44, and a raw material particle size distribution calculation unit 45. The computation unit 41 is formed by, for example, a CPU or the like, and implements respective functions of the coarse grain particle size distribution calculation unit 43, the adherent powder particle size distribution calculation unit 44, and the raw material particle size distribution calculation unit 45 by executing a program stored in the storage unit 42 on computer software. Additionally, the computation unit 41 controls operations of the coarse grain measurement device 2 and the adherent powder measurement device 3 by using a program and data stored in the storage unit 28.

In addition, the storage unit 28 previously stores the program for controlling the operations of the coarse grain measurement device 2 and the adherent powder measurement device 3, the program for executing the respective functions of the coarse grain particle size distribution calculation unit 43, the adherent powder particle size distribution calculation unit 44, and the raw material particle size distribution calculation unit 45 in the computation unit 41 on the computer software, a computation equation to be used during execution of the program, and the like.

Here, the coarse grain particle size distribution calculation unit 43 of the computation unit 41 calculates the particle size distribution of the coarse grains on the basis of the information indicating the particle size distribution of the coarse grains acquired by the coarse grain measurement device 2. The coarse grain particle size distribution calculation unit 43 acquires the profile data of the coke 13 as the information indicating the particle size distribution of the coarse grains from the laser range finder forming the coarse grain measurement device 2. Then, the coarse grain particle size distribution calculation unit 43 extracts unevenness data of the coke 13 from the profile data, and performs a particle separation process of the coke 13 by performing image processing. The particle separation process is a process for identifying particles seen in an image as each separate particle, and for example, a processing method called watershed algorithm is known. The coarse grain particle size distribution calculation unit 43 counts the number of particles for each particle size (particle diameter) of the coke 13 separated by the particle separation process to form a histogram, and calculates the particle size distribution of the coarse grains in the coke 13.

Furthermore, the adherent powder particle size distribution calculation unit 44 of the computation unit 41 calculates the particle size distribution of the adherent powder on the basis of the information indicating the particle size distribution of the adherent powder acquired by the adherent powder measurement device 3. The adherent powder particle size distribution calculation unit 44 acquires the image data of the coke 13 as the information indicating the particle size distribution of the adherent powder from the digital camera forming the adherent powder measurement device 3. Then, the adherent powder particle size distribution calculation unit 44 calculates an average brightness by arithmetically averaging brightness (0 to 255) of each pixel in the image data. The storage unit 42 previously stores a relational expression that relates average brightness to a powder rate of coke (hereinafter referred to as coke powder) having a particle size of 1 mm or less. The adherent powder particle size distribution calculation unit 44 calculates the powder rate of the coke powder as the particle size distribution of the adherent powder of the coke 13 by using the calculated average brightness and the relational expression. In this way, the adherent powder particle size distribution calculation unit 44 can calculate in real time the particle size distribution of the adherent powder in the coke 13. Note that although the powder rate of the coke powder means a ratio of a mass of the coke powder to a total mass of the coke, most of the coke having a particle diameter equal to or smaller than the mesh diameter of the sieve 11 is coke powder. Accordingly, when the powder rate of the coke powder can be calculated, the particle size distribution of the adherent powder equal to or smaller than the mesh diameter of the sieve 11 can be calculated.

Figure 5:
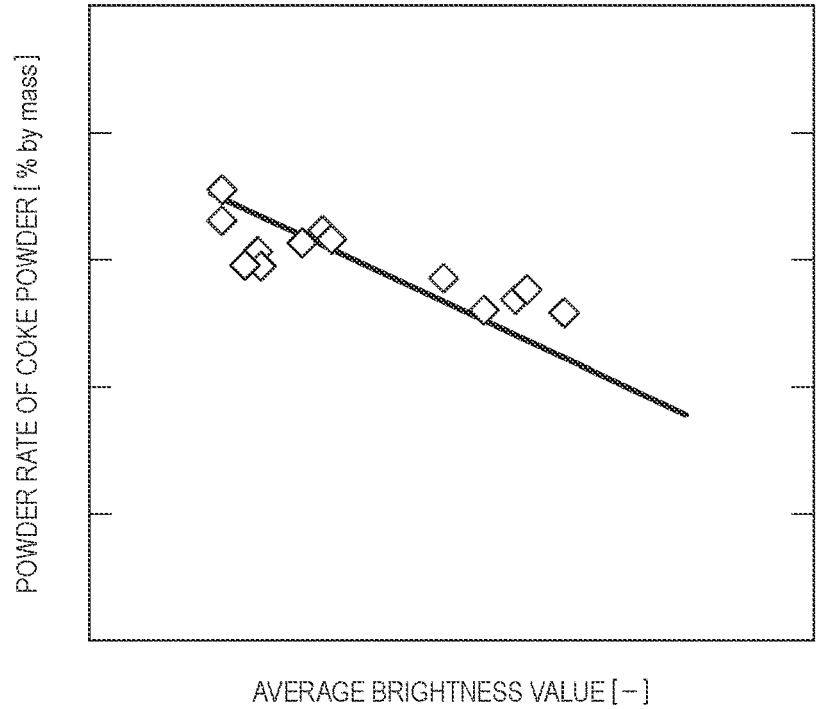
FIG. 5 is a graph illustrating a relationship between an average brightness and a powder rate of coke powder.

FIG. 5 is a graph illustrating a relationship between the average brightness and the powder rate of the coke powder. In FIG. 5, the vertical axis represents the powder rate (% by mass) of the coke powder measured by performing sieve analysis after drying the coke, and the horizontal axis represents an average brightness value obtained by arithmetically averaging the brightness of each pixel in image data generated by capturing an image of the coke.

As illustrated in FIG. 5, the powder rate of the coke powder and the average brightness are highly correlated with each other. Thus, the relational expression between the average brightness and the powder rate of the coke powder indicated by a solid line in FIG. 5 is calculated and previously stored in the storage unit 42. Then, the adherent powder particle size distribution calculation unit 44 can calculate the powder rate of the coke powder from the calculated average brightness and the above-mentioned relational expression.

Additionally, when the spectroscopic device including the spectroscopic measurement unit configured to measure spectral reflectance by dispersing reflected light from the coke 13 is used as the adherent powder measurement device 3 to acquire the spectral reflectance at the absorption wavelength of water and the spectral reflectances at the two wavelengths sandwiching the spectral reflectance that are not absorption wavelengths of water, the spectral reflectances at the three wavelengths are input to the adherent powder particle size distribution calculation unit 44.

In this case, the adherent powder particle size distribution calculation unit 44 uses the acquired three spectral reflectances to calculate an absorbance at the absorption wavelength of water. The adherent powder particle size distribution calculation unit 44 calculates a ratio of the spectral reflectance at the absorption wavelength of water to the spectral reflectances at the two wavelengths that are not absorption wavelengths of water. Then, the adherent powder particle size distribution calculation unit 44 subtracts the spectral reflectances at the two wavelengths that are not absorption wavelengths of water from the spectral reflectance at the absorption wavelength of water to calculate the absorbance at the absorption wavelength of water. The storage unit 42 stores a relational expression that relates absorbance to the powder rate of the coke powder. The adherent powder particle size distribution calculation unit 44 calculates the powder rate of the coke powder as the particle size distribution of the adherent powder by using the calculated absorbance and the relational expression.

Figure 6:
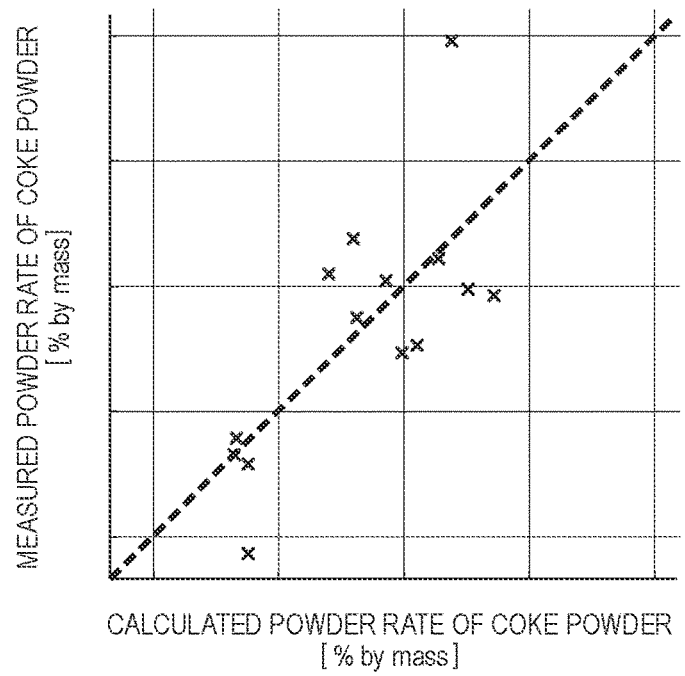
FIG. 6 is a graph illustrating a relationship between a powder rate of the coke powder calculated using absorbance and a measured powder rate of the coke powder.

FIG. 6 is a graph illustrating a relationship between the powder rate of the coke powder calculated using the absorbance and a measured powder rate of the coke powder. In FIG. 6, the vertical axis represents a measured powder rate (% by mass) of the coke powder measured by performing sieve analysis after drying the coke, and the horizontal axis represents a powder rate (% by mass) of the coke powder calculated using the absorbance. As illustrated in FIG. 6, a high correlation has been confirmed between the powder rate of the coke powder calculated from the absorbance and the measured powder rate of the coke powder obtained by the sieve analysis, which has confirmed that the powder rate of the coke powder can be calculated with high accuracy by using the absorbance.

Additionally, when the spectroscopic device including the spectroscopic measurement unit configured to measure spectral reflectance by dispersing reflected light from the coke 13 is used as the adherent powder measurement device 3 to acquire the spectral reflectances at the nine wavelengths in the visible light region and the infrared region as the information indicating the particle size distribution of the adherent powder, the spectral reflectances at the nine wavelengths are input to the adherent powder particle size distribution calculation unit 44.

In this case, the adherent powder particle size distribution calculation unit 44 calculates the particle size distribution of the adherent powder on the basis of scores of previously determined basis vectors obtained by applying principal component analysis or partial least squares (PLS) on the spectral reflectances at the nine wavelengths.

Specifically, the adherent powder particle size distribution calculation unit 44 acquires the spectral reflectances at the nine wavelengths, and then calculates the scores of the previously determined basis vectors by using the computation equation stored in the storage unit 42. The adherent powder particle size distribution calculation unit 44 calculates the powder rate of the coke powder by using a relational expression that relates the scores of basis vectors to the powder rate of the coke powder. Here, the scores of the previously determined basis vectors are the scores of basis vectors strongly correlated with changes in the powder rate of the coke 13 among nine basis vectors obtained by performing principal component analysis on the spectral reflectances at the nine wavelengths acquired from the spectroscopic device.

The storage unit 42 stores a computation equation for calculating the scores from the spectral reflectances at the nine wavelengths and a relational expression that relates the scores to the powder rate of the coke powder. The computation equation for calculating the scores and the relational expression that relates the scores to the powder rate of the coke powder calculate in the following steps.

First, the spectral reflectances at the nine wavelengths acquired from the spectroscopic device forming the adherent powder measurement device 3 are subjected to principal component analysis to acquire nine basis vectors of first to ninth principal components and nine scores calculated from the basis vectors. Next, the coke subjected to the measurement of the spectral reflectances is collected and subjected to sieve analysis to measure the powder rate of the coke powder having a particle diameter of 1 mm or less. By drying the coke and then sieving the dried coke through a sieve with openings of 1 mm, the powder rate is calculated as a ratio of a mass difference in the coke between before and after the sieving to a mass of the coke before the sieving.

The above operation is performed using types of coke different in powder rate and water content to acquire a plurality of data sets each including a powder rate and nine scores. In the plurality of data sets, the nine scores are compared between the types of coke different in powder rate to specify n (n is a natural number less than 9) pieces of scores strongly correlated with changes in the powder rate of the coke. The computation equation for calculating the specified scores can calculate using the basis vectors for the scores.

The relational expression that relates the scores to the powder rate of the coke powder is given by, for example, the following equation (1) that is a regression equation with a powder rate (Y) of the coke powder as a response variable and the specified n pieces of scores as explanatory variables (X1, X2, . . . , Xn):

$$Y = e + f1 \times X1 + f2 \times X2 + \ldots + fn \times Xn \quad (1)$$

Note that, in equation (1), e, f1, f2, . . . , fn are parameters of the regression equation.

By specifying the n pieces of scores strongly correlated with changes in the powder rate of the coke powder, each data set including the powder rate and the specified n pieces of scores can be acquired from data sets each including each powder rate of coke powder different in powder rate and water content and the nine scores. Therefore, the parameters e, f1, f2, . . . fn of equation (1) can be calculated by using the data and least squares method.

In addition, although the example has been illustrated in which when specifying the scores strongly correlated with changes in the powder rate of the coke powder, the spectral reflectances at the nine wavelengths are subjected to principal component analysis, the invention is not limited thereto. A plurality of data sets each including the powder rate and the spectral reflectances at the nine wavelengths may be acquired, and partial least squares (PLS) may be applied on the acquired data to directly obtain the scores strongly correlated with the powder rate of the coke powder. In this case, the computation equation for calculating the scores strongly correlated with the powder rate of the coke powder can calculate from the basis vectors for the scores obtained by partial least squares (PLS). Additionally, the relational expression between the powder rate of the coke powder and the scores is given by the same regression equation as equation (1). The parameters of the regression equation in equation (1) can also be calculated by a plurality of data sets each including the scores obtained by partial least squares (PLS) and the powder rate and least squares method.

Figure 7:
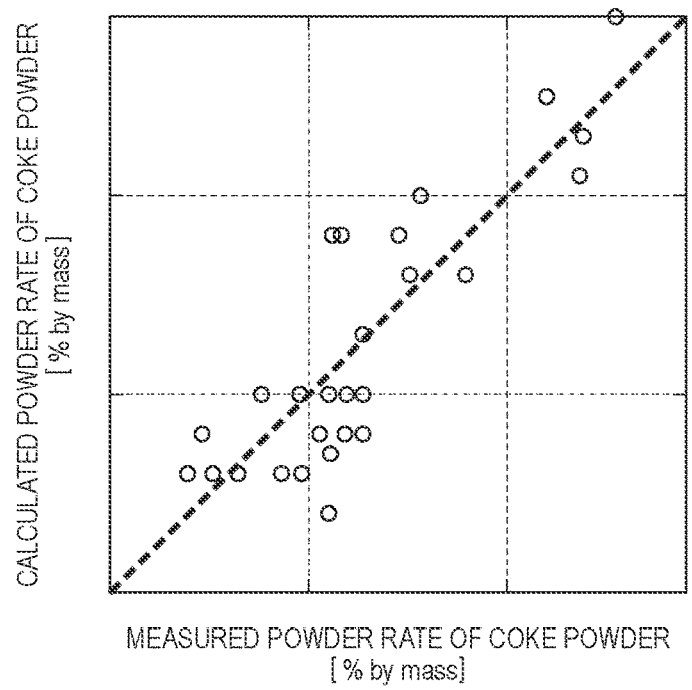
FIG. 7 is a graph illustrating a relationship between the measured powder rate of the coke powder and a powder rate of the coke powder calculated from scores obtained by applying partial least squares (PLS)

FIG. 7 is a graph illustrating a relationship between the measured powder rate of the coke powder and the powder rate of the coke powder calculated from the scores obtained by applying partial least squares (PLS). In FIG. 7, the horizontal axis represents the measured powder rate of the coke powder, and the vertical axis represents the calculated powder rate of the coke powder. By drying the coke and then sieving the dried coke through a sieve with openings of 1 mm, the measured powder rate of the coke powder was calculated as a ratio of a mass difference in the coke between before and after the sieving to a mass before the sieving. The calculated powder rate of the coke powder is the powder rate of the coke powder calculated by a regression equation with the powder rate of the coke powder as a response variable and two scores strongly correlated with the powder rate of the coke powder obtained by applying partial least squares (PLS) as explanatory variables. As illustrated in FIG. 7, a strong correlation is found between the calculated powder rate of the coke powder and the measured powder rate of the coke powder. These results have confirmed that the powder rate of the coke powder can be measured with sufficient accuracy even by calculating from the scores obtained by applying partial least squares (PLS).

Figure 8:
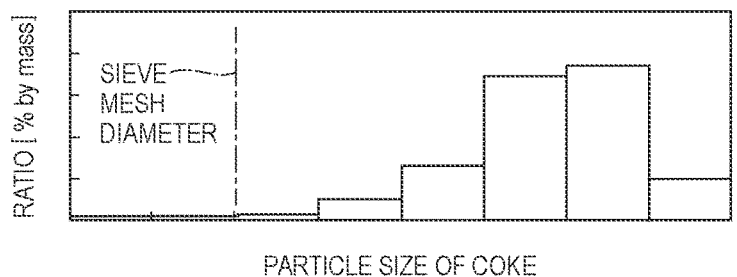
FIG. 8 is a graph illustrating an example of a particle size distribution of coke.

Note that FIG. 8 is a graph illustrating the particle size distribution of the coke 13 conveyed by the conveyor 12. A dashed and dotted line in FIG. 8 represents the mesh diameter of the sieve 11. As illustrated in FIG. 8, most of fine particles equal to or smaller than the mesh diameter in the coke 13 sieved through the sieve 11 are sieved through the sieve 11 and thereby removed from the coke 13 conveyed by the conveyor 12, so that the rate thereof is small.

However, the coke 13 sieved through the sieve 11 still includes the coke 13 including adherent powder adhering to coarse grains that is small in amount but equal to or smaller in size than the mesh size of the sieve 11. Such a small amount of adherent powder also affects the particle size distribution and ventilation capabilities in the blast furnace, due to which it is necessary to measure the particle size distribution of the adherent powder equal to or smaller in size than the mesh size of the sieve 11. Therefore, as described above, the adherent powder measurement device 3 and the adherent powder particle size distribution calculation unit 44 are provided to calculate the particle size distribution of the adherent powder.

Next, the raw material particle size distribution calculation unit 45 of the computation unit 41 calculates the particle size distribution of the coke (raw material) 13 on the basis of the particle size distribution of the coarse grains calculated by the coarse grain particle size distribution calculation unit 43 and the adherent powder particle size distribution calculated by the adherent powder particle size distribution calculation unit 44.

Figure 9:
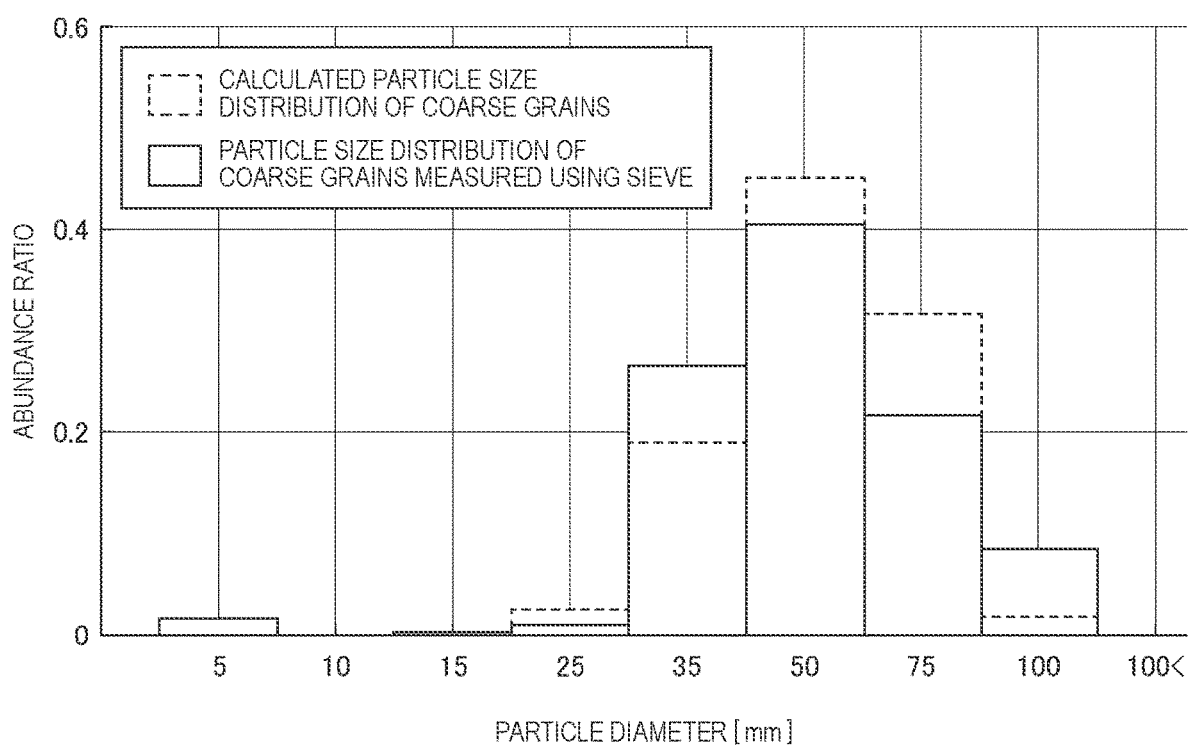
FIG. 9 is a graph illustrating an example of comparison between a particle size distribution of coarse grains measured using a sieve and a particle size distribution of the coarse grains calculated by a coarse grain particle size distribution calculation unit using a laser range finder.

Here, FIG. 9 illustrates an example of comparison between a particle size distribution of the coarse grains measured using a sieve (measured values of the particle size distribution of the coarse grains in the coke 13 sieved through a sieve) and a particle size distribution of the coarse grains calculated by the coarse grain particle size distribution calculation unit 43 using a laser range finder. Reference to FIG. 9 indicates that particle sizes in the particle size distribution of the coarse grains calculated by the coarse grain particle size distribution calculation unit 43 using the laser range finder tend to be larger than those in the particle size distribution of the coarse grains measured using the sieve. In general, when vibration is applied to a particulate material having a particulate distribution, large particles float up to an upper layer. This phenomenon is known as the Brazilian nut effect. Since the laser range finder measures only the upper layer on the conveyor 12, large particles float up due to vibration when the coke (raw material) 13 is discharged from the hopper 10 onto the conveyor 12 and vibration during transportation. As a result, the particle size distribution measured by the laser range finder becomes larger than the entire particle size distribution including a lower layer, so that the particle size distribution of the coarse grains calculated by the coarse grain particle size distribution calculation unit 43 becomes large.

Due to this, the raw material particle size distribution calculation unit 45 includes a coarse grain particle size distribution correction unit 46 configured to correct such that the particle size distribution of the coarse grains calculated by the coarse grain particle size distribution calculation unit 43 coincides with the particle size distribution of the coarse grains previously measured using the sieve, without directly using the particle size distribution of the coarse grains calculated by the coarse grain particle size distribution calculation unit 43.

Then, the raw material particle size distribution calculation unit 45 causes the corrected raw material particle size distribution calculation unit 47 to calculate a particle size distribution of the coke (raw material) 13 on the basis of a particle size distribution of the coarse grains obtained by correcting the particle size distribution of the coarse grains calculated by the coarse grain particle size distribution calculation unit 43 by the coarse grain particle size distribution correction unit 46 and the particle size distribution of the adherent powder calculated by the adherent powder particle size distribution calculation unit 44.

Figure 10:
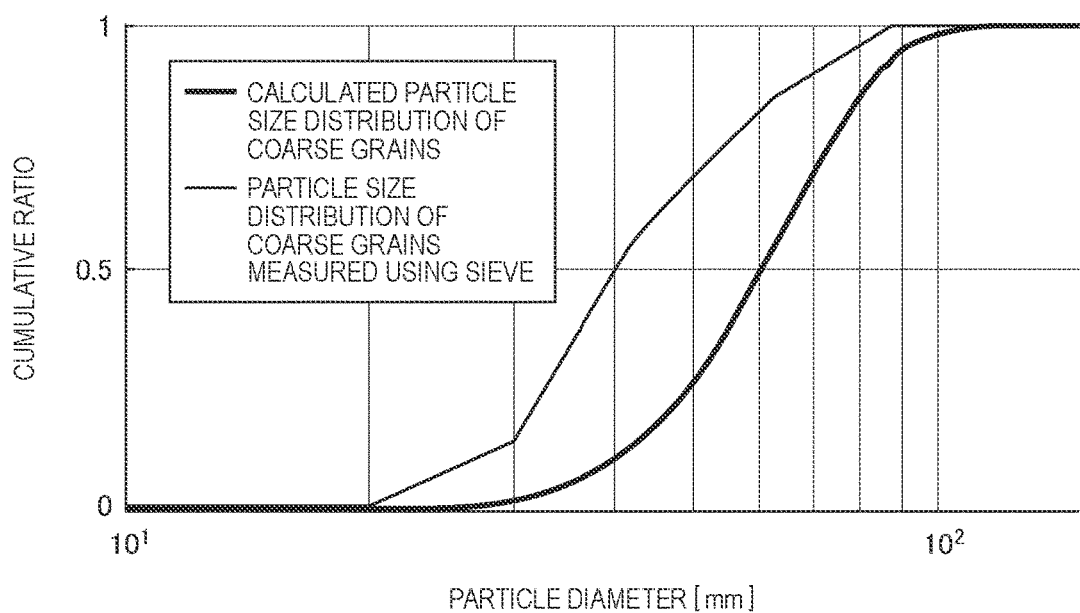
FIG. 10 is a graph illustrating an example of comparison between a cumulative particle size distribution of the coarse grains measured using the sieve and a cumulative particle size distribution of the coarse grains calculated by the coarse grain particle size distribution calculation unit using the laser range finder.
Figure 11:
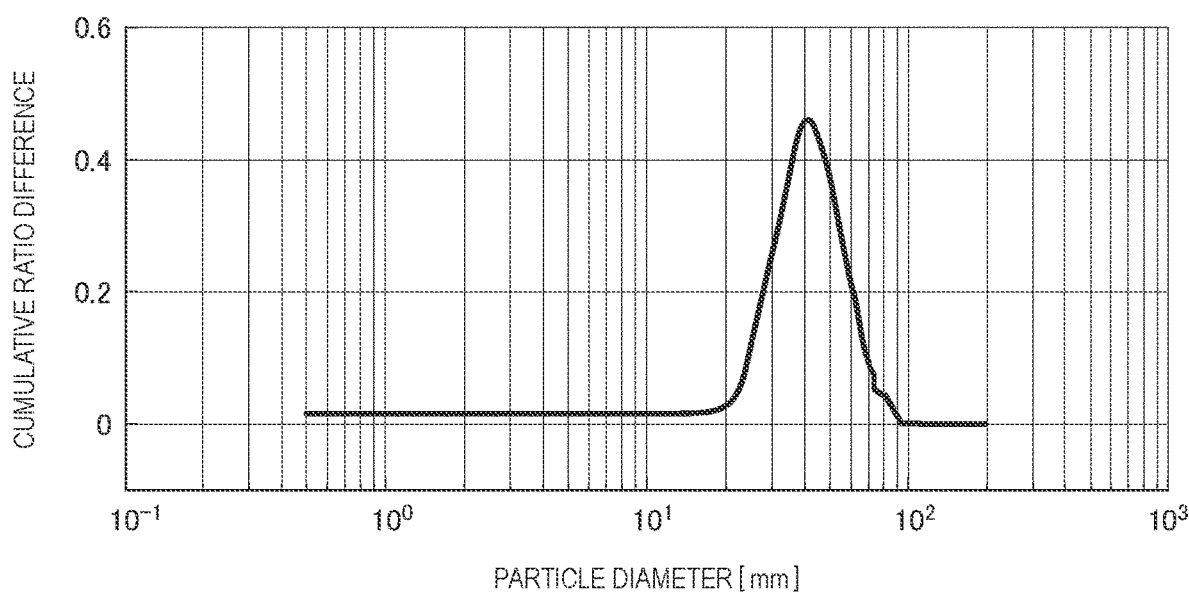
FIG. 11 is a graph illustrating an example of a difference obtained by subtracting the cumulative particle size distribution of the coarse grains calculated by the coarse grain particle size distribution calculation unit using the laser range finder from the cumulative particle size distribution of the coarse grains measured using the sieve.

Here, FIG. 10 illustrates an example of comparison between a cumulative particle size distribution of the coarse grains measured using a sieve and a cumulative particle size distribution of the coarse grains calculated by the coarse grain particle size distribution calculation unit using a laser range finder. As illustrated in the example, when compared between the cumulative particle size distributions, values of respective particle sizes (particle diameters) in the cumulative particle size distribution of the coarse grains measured using the sieve are always larger than those in the cumulative particle size distribution of the coarse grains calculated by the coarse grain particle size distribution calculation unit using the laser range finder. FIG. 11 illustrates a graph of an example of a difference obtained by subtracting the cumulative particle size distribution of the coarse grains calculated by the coarse grain particle size distribution calculation unit using the laser range finder from the cumulative particle size distribution of the coarse grains measured using the sieve. At this time, it has been found that in any measurement, the difference forms a mountain shape with a normal distribution on a logarithmic particle size axis, and is substantially constant in each measurement.

Thus, the coarse grain particle size distribution correction unit 46 calculates the difference between the particle size distribution of the coarse grains previously measured using the sieve and the particle size distribution of the coarse grains calculated by the coarse grain particle size distribution calculation unit 43. Then, the coarse grain particle size distribution correction unit 46 performs the calculation of the difference a plurality of times with respect to the particle size distribution of the coarse grains previously measured using the sieve and the particle size distribution of the coarse grains calculated by the coarse grain particle size distribution calculation unit 43. Then, the coarse grain particle size distribution correction unit 46 averages the plurality of difference particle size distributions, and corrects the particle size distribution of the coarse grains calculated by the coarse grain particle size distribution calculation unit 43 by using an averaged average difference particle size distribution as a correction value.

Note that regarding the particle size distribution of the coarse grains measured using the sieve, a plurality of particle size distributions of the coarse grains are previously measured using the sieve, and the data is stored in the storage unit 42.

Figure 12:
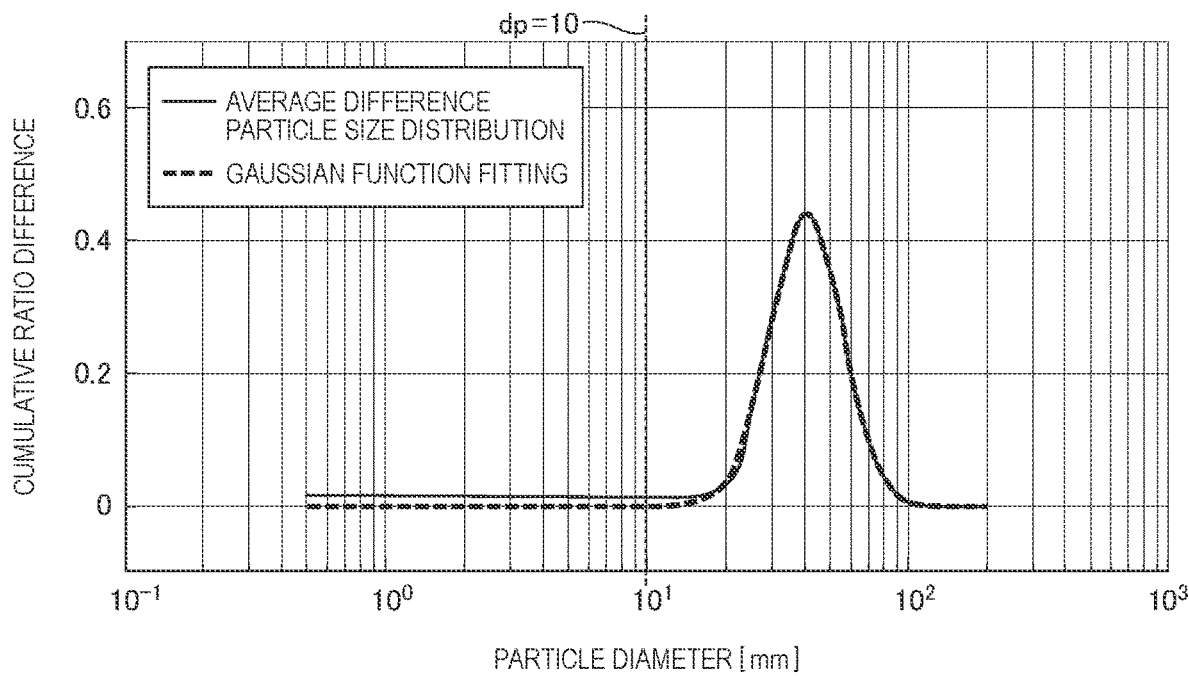
FIG. 12 is a graph illustrating an example of an average difference particle size distribution obtained by averaging the difference between the particle size distribution of the coarse grains measured using the sieve and the particle size distribution of the coarse grains calculated by the coarse grain particle size distribution calculation unit using the laser range finder.

FIG. 12 illustrates an example of the average difference particle size distribution obtained by averaging the difference between the particle size distribution of the coarse grains measured using a sieve and the particle size distribution of the coarse grains calculated by the coarse grain particle size distribution calculation unit 43 using a laser range finder. "dp" represents a threshold value indicating a region of the adherent powder. The adherent powder equal to or less than the threshold value "dp" is corrected by another method, so that the value of the average difference particle size distribution is set to 0 in the region equal to or less than the threshold value "dp". In FIG. 12, the dotted line is a curve fitted by a Gaussian function in a state where the value of the average difference particle size distribution equal to or less than the threshold value "dp" is set to 0.

Note that although the average difference particle size distribution itself is used as the correction value, a curve fitted using a mountain-shaped function may be used as a correction distribution when the average difference particle size distribution is distorted due to disturbances, such as cases where there are many outliers. Particularly, by selecting Gaussian function as a fitting curve, the correction distribution can be represented by three parameters as in the following expression, which is advantageous in terms of actual operation.

$$a \exp\left[-\frac{(x-b)^2}{2c^2}\right] \quad \text{[Math. 1]}$$

Figure 13:
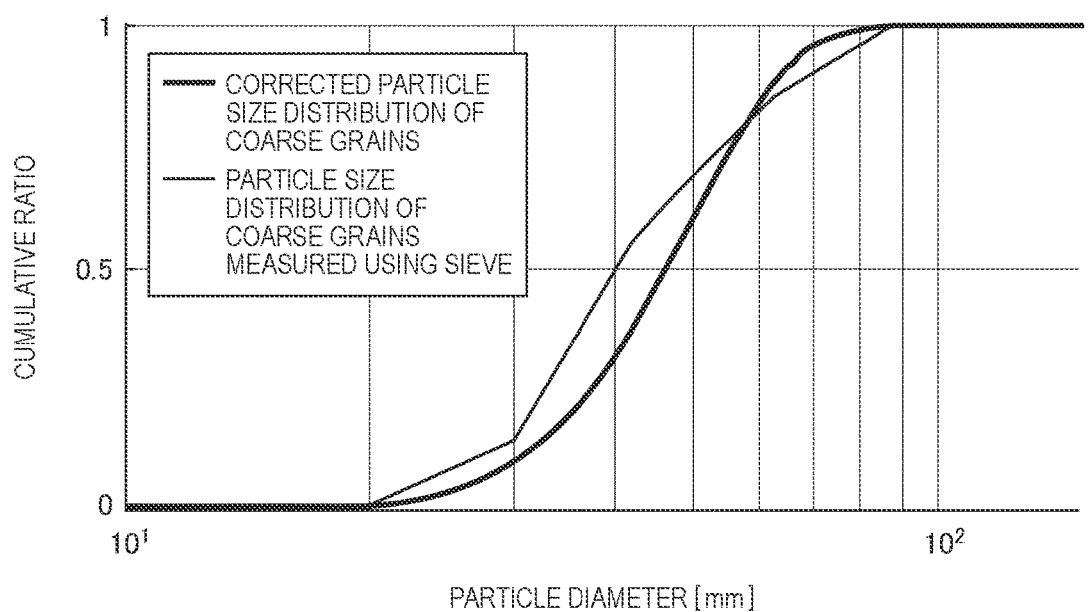
FIG. 13 is a graph of an example of cumulative particle size distributions illustrated by comparison between the particle size distribution of the coarse grains measured using the sieve and a particle size distribution of the coarse grains obtained by correcting the particle size distribution of the coarse grains calculated by the coarse grain particle size distribution calculation unit using the laser range finder by using the average difference particle size distribution as a correction value.

FIG. 13 illustrates an example of cumulative particle size distributions obtained by comparing the particle size distribution of the coarse grains measured using the sieve with a particle size distribution obtained by correcting the particle size distribution of the coarse grains calculated by the coarse grain particle size distribution calculation unit 43 using the laser range finder by using the average difference particle size distribution as a correction value. The cumulative particle size distribution is closer to that of the sieve analysis values than before correction.

Figure 14:
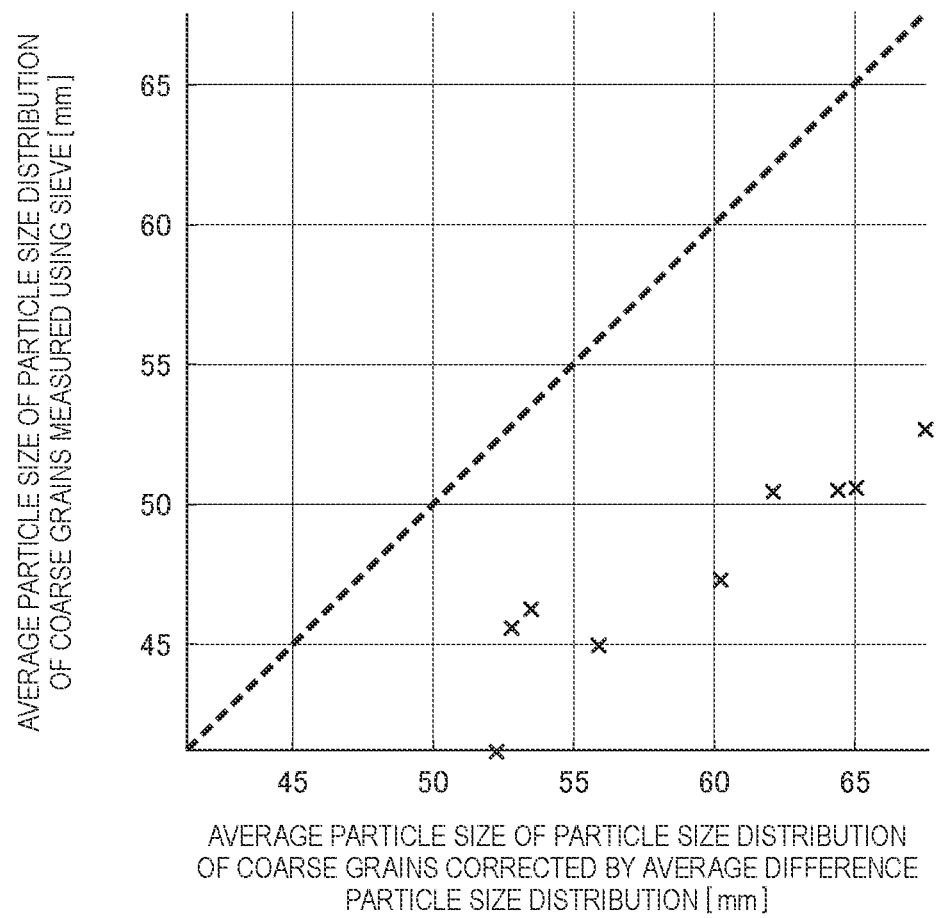
FIG. 14 is a graph illustrating an example of a relationship between an average particle size of the particle size distribution of the coarse grains corrected by using the average difference particle size distribution as the correction value and an average particle size of the particle size distribution of the coarse grains measured using the sieve.

The method of correcting the particle size distribution of the coarse grains calculated by the coarse grain particle size distribution calculation unit 43 by using the average difference particle size distribution as the correction value is effective in terms of making the cumulative particle size distributions coincident. However, considering the average particle size, the method of correcting by using the average difference particle size distribution as the correction value may generate data on which some fixed bias is applied. FIG. 14 illustrates an example of a relationship between an average particle size of the particle size distribution of the coarse grains corrected by using the average difference particle size distribution as the correction value and an average particle size of the particle size distribution of the coarse grains measured using the sieve. As is seen here, there is a deviation of 5 mm or more between the average particle size of the particle size distribution of the coarse grains corrected by using the average difference particle size distribution as the correction value and the average particle size of the particle size distribution of the coarse grains measured using the sieve. The deviation of 5 mm or more is seen between each of average particle sizes of particle size distributions of the coarse grains measured using a plurality of sieves and each of average particle sizes of particle size distributions of the coarse grains corrected by a plurality of coarse grain particle size distribution correction units 46.

Thus, the coarse grain particle size distribution correction unit 46 calculates an average particle size of each of the particle size distribution of the coarse grains previously measured using the sieve and the particle size distribution of the coarse grains corrected by the coarse grain particle size distribution correction unit 46 (corrected using the average difference particle size distribution as the correction value). Then, the coarse grain particle size distribution correction unit 46 performs the calculation of the average particle size a plurality of times with respect to the particle size distribution of the coarse grains previously measured using the sieve and the particle size distribution of the coarse grains corrected by the coarse grain particle size distribution correction unit 46. Furthermore, the coarse grain particle size distribution correction unit 46 calculates a particle diameter correction factor "a" such that, in results of the calculation of the average particle size performed the plurality of times, the average particle size of the particle size distribution of the coarse grains corrected by the coarse grain particle size distribution correction unit 46 (corrected using the average difference particle size distribution as the correction value) approaches the average particle sizes of the particle size distribution of the coarse grains previously measured using the sieve. Then, the coarse grain particle size distribution correction unit 46 uses the calculated particle diameter correction factor "a" as a correction value to correct the average particle size of the particle size distribution of the coarse grains corrected by the coarse grain particle size distribution correction unit 46 (corrected using the average difference particle size distribution as the correction value).

Here, when making a correction such that the average particle size of the particle size distribution of the coarse grains corrected by the coarse grain particle size distribution correction unit 46 (corrected using the average difference particle size distribution as the correction value) approaches the average particle size of the particle size distribution of the coarse grains measured using the sieve, it is conceivable that the correction will be made such that the average particle size of the particle size distribution of the coarse grains corrected by the coarse grain particle size distribution correction unit 46 is reduced by a difference between the average particle sizes.

However, simply making the correction such that the average particle size of the particle size distribution of the coarse grains corrected by the coarse grain particle size distribution correction unit 46 is reduced by the difference between the average particle sizes is not appropriate, since a region with small particle diameters becomes negative.

Therefore, a ratio is taken between an average particle size d1 of the particle size distribution of the coarse grains previously measured using the sieve and an average particle size d2 of the particle size distribution of the coarse grains corrected by the coarse grain particle size distribution correction unit 46 (corrected using the average difference particle size distribution as the correction value), and the ratio (d1/d2) is defined as the particle diameter correction factor "a". Then, the average particle size of the particle size distribution of the coarse grains corrected by the coarse grain particle size distribution correction unit 46 (corrected using the average difference particle size distribution as the correction value) is multiplied by the particle diameter correction factor "a" to obtain a corrected average particle size of the particle size distribution of the coarse grains.

Note that the calculation of the average particle size of each of the particle size distribution of the coarse grains previously measured using the sieve and the particle size distribution of the coarse grains corrected by the coarse grain particle size distribution correction unit 46 (corrected using the average difference particle size distribution as the correction value) is performed a plurality of times. Here, the particle diameter correction factor "a" is calculated assuming that at each of the plurality of times, the same ratio is obtained between the average particle size of the particle size distribution of the coarse grains previously measured using the sieve and the average particle size of the particle size distribution of the coarse grains corrected by the coarse grain particle size distribution correction unit 46 (corrected using the average difference particle size distribution as the correction value).

Here, what is often used as an average diameter (average particle size) is an arithmetic average diameter represented by the following expression:

$$\sum_{i=1}^{N} w_i d_i / \sum_{i=1}^{N} w_i \qquad [\text{Math. 2}]$$

or a harmonic average diameter represented by the following expression:

$$\sum_{i=1}^{N} w_i / \sum_{i=1}^{N} \frac{w_i}{d_i} \qquad [\text{Math. 3}]$$

However, the present invention is not limited thereto, and another average diameter calculation method may be used.

Figure 15:
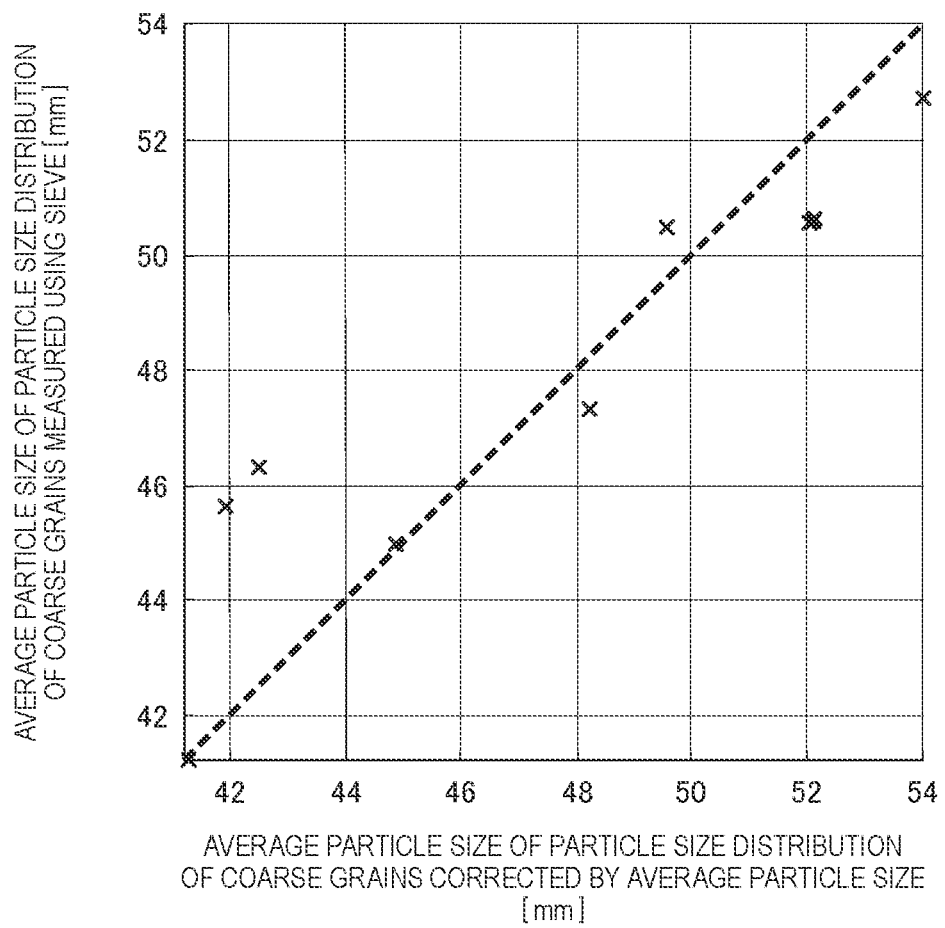
FIG. 15 is a graph illustrating an example of a relationship between an average particle size of a particle size distribution of the coarse grains corrected by the average particle size as an arithmetic average diameter and the average particle size of the particle size distribution of the coarse grains measured using the sieve.

FIG. 15 illustrates an example of a relationship between an average particle size of the particle size distribution of the coarse grains corrected by the average particle size as the arithmetic average diameter and the average particle size of the particle size distribution of the coarse grains measured using the sieve. It can be seen that the average particle size of the particle size distribution of the coarse grains corrected by the average particle size is coincident with the average particle size of the particle size distribution of the coarse grains previously measured using the sieve.

Then, the corrected raw material particle size distribution calculation unit 47 of the raw material particle size distribution calculation unit 45 calculates the particle size distribution of the coke (raw material) 13 on the basis of the particle size distribution of the coarse grains obtained by correcting the particle size distribution of the coarse grains calculated by the coarse grain particle size distribution calculation unit 43 by the coarse grain particle size distribution correction unit 46 and the particle size distribution of the adherent powder calculated by the adherent powder particle size distribution calculation unit 44.

Additionally, as illustrated in FIG. 1, the corrected raw material particle size distribution calculation unit 47 is connected to a display device 5 that displays the particle size distribution of the coke (raw material) 13 calculated by the corrected raw material particle size distribution calculation unit 47. The display device 5 is formed by an output device such as a printer.

Figure 2:
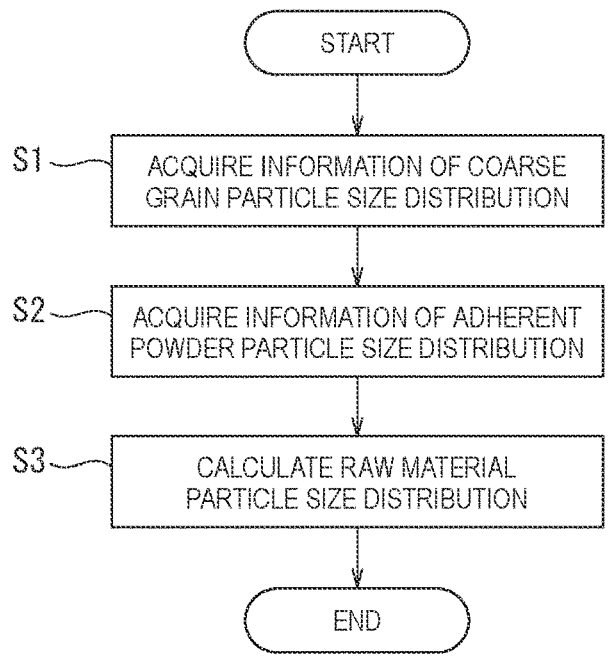
FIG. 2 is a flowchart illustrating a process flow by the particle size distribution measurement apparatus illustrated in FIG. 1.
Figure 3:
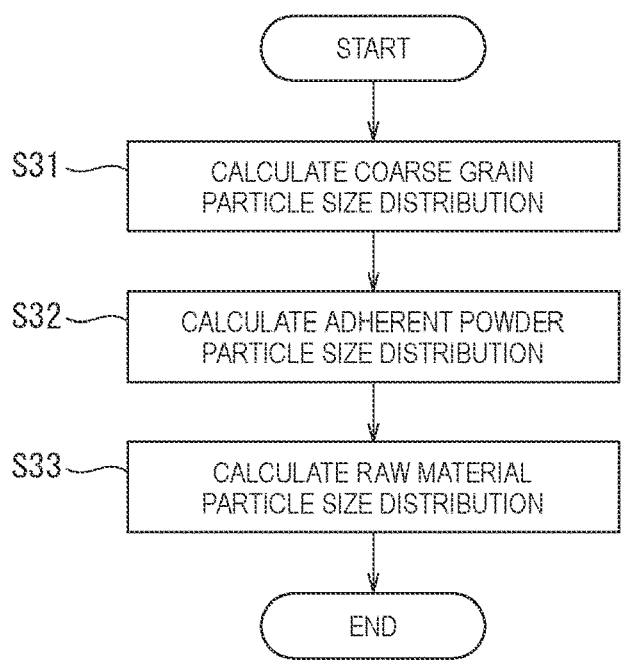
FIG. 3 is a flowchart illustrating a process flow of step S3 illustrated in FIG. 2, which is an execution process of a computation device.
Figure 4:
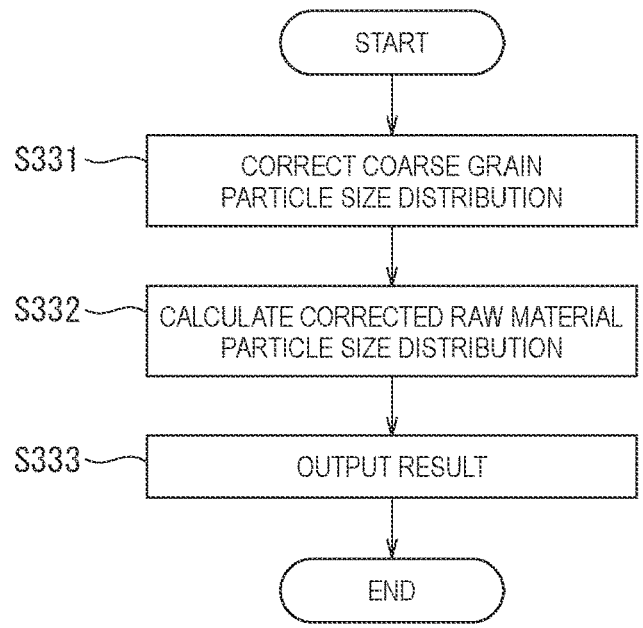
FIG. 4 is a flowchart illustrating a process flow of step S33 illustrated in FIG. 3, which is an execution process of a raw material particle size distribution calculation unit.

Next, a particle size distribution measurement method according to an embodiment of the present invention will be described with reference to FIG. 1 to FIG. 4. FIG. 2 is a flowchart illustrating a process flow by the particle size distribution measurement apparatus illustrated in FIG. 1. FIG. 3 is a flowchart illustrating a process flow of step S3 illustrated in FIG. 2, which is an execution process of the computation device. FIG. 4 is a flowchart illustrating a process flow of step S33 illustrated in FIG. 3, which is an execution process of the raw material particle size distribution calculation unit.

First, at step S1 illustrated in FIG. 2, the coarse grain measurement device 2 acquires information indicating the particle size distribution of the coarse grains of the coke (raw material) 13 flowing on the conveyor 12 (a coarse grain measurement step).

Here, the coarse grain measurement device 2 is a laser range finder, and at the coarse grain measurement step, the laser range finder measures a distance to the coke 13 and acquires profile data of the coke 13 that is the distance from the laser range finder to the coke 13 as the information indicating the particle size distribution of the coarse grains.

Next, at step S2, the adherent powder measurement device 3 acquires information indicating the particle size distribution of the adherent powder adhering to the coarse grains of the coke 13 flowing on the conveyor 12 (an adherent powder measurement step).

Here, the adherent powder measurement device 3 is an image capturing device, and at the adherent powder measurement step, the image capturing device captures an image of the coke 13 and acquires image data of the coke 13 captured as the information indicating the particle size distribution of the adherent powder.

Note that, as the adherent powder measurement device 3, a spectroscopic device may be used that includes a spectroscopic measurement unit configured to measure spectral reflectance by dispersing reflected light from the coke 13. In this case, the spectroscopic device acquires in real time a spectral reflectance at an absorption wavelength of water and spectral reflectances at two wavelengths sandwiching the wavelength that are not absorption wavelengths of water, as the information indicating the particle size distribution of the adherent powder. Alternatively, the spectroscopic device may acquire spectral reflectances at a plurality of wavelengths in the visible light region and the infrared region as the information indicating the particle size distribution of the adherent powder.

Then, at step S3, the computation device 4 calculates the particle size distribution of the coke 13 (a computation step).

Details of the computation step are illustrated in FIG. 3. First, at step S31, on the basis of the information indicating the particle size distribution of the coarse grains acquired at step S1 (the coarse grain measurement step), the coarse grain particle size distribution calculation unit 43 of the computation device 4 calculates the particle size distribution of the coarse grains (a coarse grain particle size distribution calculation step).

At the coarse grain particle size distribution calculation step, the profile data of the coke 13 is acquired as the information indicating the particle size distribution of the coarse grains from the laser range finder forming the coarse grain measurement device 2, and the particle size distribution of the coarse grains is calculated on the basis of the acquired profile data of the coke 13.

Next, at step S32, on the basis of the information indicating the particle size distribution of the adherent powder acquired at step S2 (the adherent powder measurement step), the adherent powder particle size distribution calculation unit 44 of the computation device 4 calculates the particle size distribution of the adherent powder (an adherent powder particle size distribution calculation step).

At the adherent powder particle size distribution calculation step, image data of the coke 13 captured as the information indicating the particle size distribution of the adherent powder is acquired from the image capturing device forming the adherent powder measurement device 3, and the particle size distribution of the adherent powder is calculated on the basis of an average brightness obtained by averaging brightness of each pixel in the acquired image data.

Additionally, at the adherent powder particle size distribution calculation step, when a spectral reflectance at an absorption wavelength of water and spectral reflectances at two wavelengths sandwiching the wavelength that are not absorption wavelengths of water are acquired as the information including the particle size distribution of the adherent powder from the spectroscopic device forming the adherent powder measurement device 3, the acquired three spectral reflectances are used to calculate an absorbance at the absorption wavelength of water. The particle size distribution of the adherent powder is calculated using a relational expression that relates absorbance to the powder rate of the coke powder and the calculated absorbance.

In addition, at the adherent powder particle size distribution calculation step, when spectral reflectances at a plurality of wavelengths in the visible light region and the infrared region are acquired as the information indicating the particle size distribution of the adherent powder from the spectroscopic device forming the adherent powder measurement device 3, the particle size distribution of the adherent powder is calculated on the basis of scores of previously determined basis vectors obtained by performing principal component analysis or partial least squares (PLS) on the acquired spectral reflectances at the plurality of wavelengths.

Next, at step S33, the raw material particle size distribution calculation unit 45 of the computation device 4 calculates the particle size distribution of the coke 13 on the basis of the particle size distribution of the coarse grains calculated at step S31 and the particle size distribution of the adherent powder calculated at step S32 (a raw material particle size distribution calculation step).

Details of the raw material particle size distribution calculation step are illustrated in FIG. 4.

First, at step S331, the coarse grain particle size distribution correction unit 46 of the raw material particle size distribution calculation unit 45 corrects such that the particle size distribution of the coarse grains calculated at step S31 (the coarse grain particle size distribution calculation step) coincides with the particle size distribution of the coarse grains previously measured using a sieve (a coarse grain particle size distribution correction step).

At the coarse grain particle size distribution correction step, a difference is calculated between the particle size distribution of the coarse grains previously measured using the sieve and the particle size distribution of the coarse grains calculated at step S31 (the coarse grain particle size distribution calculation step). The calculation of the difference is performed a plurality of times with respect to the particle size distribution of the coarse grains previously measured using the sieve and the particle size distribution of the coarse grains calculated at the coarse grain particle size distribution calculation step. Then, the plurality of differences between the particle size distributions are averaged to calculate an averaged average difference particle size distribution, and the calculated average difference particle size distribution is used as a correction value to correct the particle size distribution of the coarse grains calculated at step S31 (the coarse grain particle size distribution calculation step).

Additionally, at the coarse grain particle size distribution correction step, an average particle size of each of the particle size distribution of the coarse grains previously measured using the sieve and the particle size distribution of the coarse grains corrected at the coarse grain particle size distribution correction step is calculated. Then, the calculation of the average particle size is performed a plurality of times with respect to the particle size distribution of the coarse grains previously measured using the sieve and the particle size distribution of the coarse grains corrected at the coarse grain particle size distribution correction step. Then, a calculation is performed to obtain the particle diameter correction factor "a" such that, in results of the calculation of the average particle size performed the plurality of times, the average particle size of the particle size distribution of the coarse grains corrected at the coarse grain particle size distribution correction step approaches the average particle size of the particle size distribution of the coarse grains previously measured using the sieve. Then, the calculated particle diameter correction factor "a" is used as a correction value to correct the average particle size of the particle size distribution of the coarse grains corrected at the coarse grain particle size distribution correction step.

Next, at step S332, on the basis of the particle size distribution of the coarse grains obtained by correcting the particle size distribution of the coarse grains calculated at step S31 (the coarse grain particle size distribution calculation step) at step S331 and the particle size distribution of the adherent powder calculated at step S32 (the adherent powder particle size distribution calculation step), the corrected raw material particle size distribution calculation unit 47 of the raw material particle size distribution calculation unit 45 calculates the particle size distribution of the coke (raw material) 13 (a corrected raw material particle size distribution calculation step).

Lastly, at step S333, the corrected raw material particle size distribution calculation unit 47 outputs the particle size distribution of the coke (raw material) 13 that is a result of the calculation to the display device 5.

As a result, processing by the particle size distribution measurement apparatus 1 is ended.

Thus, according to the particle size distribution measurement apparatus and the particle size distribution measurement method according to the present embodiment, the particle size distribution of the coarse grains of the coke (raw material) 13 and the particle size distribution of the adherent powder adhering to the coarse grains are calculated in real time. Then, on the basis of the calculated particle size distribution of the coarse grains and the calculated particle size distribution of the adherent powder, the particle size distribution of the coke (raw material) 13 is calculated. This enables highly accurate measurement of the particle size distribution of the coke (raw material) 13 including the coarse grains and the adherent powder adhering to the coarse grains.

Furthermore, according to the particle size distribution measurement apparatus and the particle size distribution measurement method according to the present embodiment, the correction is made such that the calculated particle size distribution of the coarse grains coincides with the particle size distribution of the coarse grains previously measured using the sieve. This enables the particle size distribution of the coarse grains to be measured with higher accuracy, resulting in more highly accurate measurement of the particle size distribution of the coke (raw material) 13.

While the embodiment of the present invention has been described above, the present invention is not limited thereto, and various changes and modifications can be made.

For example, the particle size distribution measurement apparatus and the particle size distribution measurement method according to the present invention can be applied to all technologies for measuring the particle size distribution of a raw material including coarse grains and adherent powder adhering to the coarse grains as well as those for measuring the particle size distribution of coke, which is one of blast-furnace raw materials, conveyed by a conveyor in a manufacturing process using a blast furnace.

In addition, although the laser range finder has been used as the coarse grain measurement device 2, the present invention is not limited thereto. For example, the coarse grain measurement device 2 can be any that is capable of observing an upper surface of the coke 13 on the conveyor 12 and acquiring information indicating the particle size distribution of the coarse grains, such as a combination of a camera and lighting.

Additionally, the adherent powder measurement device 3 is limited to neither an image capturing device nor a spectroscopic device, and may be a laser scattering type particle size distribution measurement device capable of measuring the particle size distribution of coke powder from a light intensity distribution pattern of intense scattered light of laser applied to the coke 13. In this case, the laser scattering type particle size distribution measurement device acquires the particle size distribution of the coke powder in real time (every 30 seconds). Then, the laser scattering type particle size distribution measurement device outputs the acquired particle size distribution of the coke powder to the adherent powder particle size distribution calculation unit 44 of the computation device 4.

Furthermore, in the present embodiment, the coarse grain particle size distribution correction unit 46 uses the average difference particle size distribution as a correction value to correct the particle size distribution of the coarse grains calculated by the coarse grain particle size distribution calculation unit 43, and uses the particle diameter correction factor "a" as a correction value to correct the average particle size of the particle size distribution of the coarse grains corrected by the coarse grain particle size distribution correction unit 46 (corrected using the average difference particle size distribution as a correction value).

However, when it is desired to manage using only a cumulative distribution profile, the coarse grain particle size distribution correction unit 46 may use an average difference particle size distribution as a correction value to correct only the particle size distribution of the coarse grains calculated by the coarse grain particle size distribution calculation unit 43. Alternatively, when it is desired to manage using only an average particle diameter, the particle diameter correction factor "a" may be used as a correction value to correct only the average particle size of the particle size distribution of the coarse grains.

When it is desired to manage using only an average particle diameter, specifically, the coarse grain particle size distribution correction unit 46 (the coarse grain particle size distribution correction step) calculates the average particle size of each of the particle size distribution of the coarse grains previously measured using a sieve and the particle size distribution of the coarse grains calculated by the coarse grain particle size distribution calculation unit 43 (the coarse grain particle size distribution calculation step). Then, the calculation of the average particle size is performed a plurality of times with respect to the particle size distribution of the coarse grains previously measured using the sieve and the particle size distribution of the coarse grains calculated by the coarse grain particle size distribution calculation unit 43 (the coarse grain particle size distribution calculation step). Next, the calculation is performed to obtain the particle diameter correction factor "a" such that, in the results of the calculation of each average particle size performed the plurality of times, the average particle size of the particle size distribution of the coarse grains calculated by the coarse grain particle size distribution calculation unit 43 (the coarse grain particle size distribution calculation step) approaches the average particle size of the particle size distribution of the coarse grains previously measured using the sieve. Then, the calculated particle diameter correction factor "a" is used as a correction value to correct the average particle size of the particle size distribution of the coarse grains calculated by the coarse grain particle size distribution calculation unit 43 (the coarse grain particle size distribution calculation step).

REFERENCE SIGNS LIST

1: Particle size distribution measurement apparatus
2: Coarse grain measurement device
3: Adherent powder measurement device
4: Computation device
5: Display device
10: Hopper
11: Sieve
12: Conveyor
13: Coke (raw material)
41: Computation unit
42: Storage unit
43: Coarse grain particle size distribution calculation unit
44: Adherent powder particle size distribution calculation unit
45: Raw material particle size distribution calculation unit
46: Coarse grain particle size distribution correction unit
47: Corrected raw material particle size distribution calculation unit

The invention claimed is:

1. A particle size distribution measurement apparatus for measuring a particle size distribution of a raw material including coarse grains and adherent powder adhering to the coarse grains, the apparatus comprising:
a coarse grain measurement device configured to acquire information indicating a particle size distribution of the coarse grains;
an adherent powder measurement device configured to acquire information indicating a particle size distribution of the adherent powder; and
a computation device configured to calculate the particle size distribution of the raw material,
wherein the computation device includes a coarse grain particle size distribution calculation unit configured to calculate the particle size distribution of the coarse grains on a basis of the information indicating the particle size distribution of the coarse grains acquired by the coarse grain measurement device, an adherent powder particle size distribution calculation unit configured to calculate the particle size distribution of the adherent powder on a basis of the information indicating the particle size distribution of the adherent powder acquired by the adherent powder measurement device, and a raw material particle size distribution calculation unit configured to calculate the particle size distribution of the raw material on a basis of the particle size distribution of the coarse grains calculated by the coarse grain particle size distribution calculation unit and the particle size distribution of the adherent powder calculated by the adherent powder particle size distribution calculation unit.

2. The particle size distribution measurement apparatus according to claim 1, wherein the coarse grain measurement device is a laser range finder, the laser range finder measuring a distance to the raw material to acquire profile data of the raw material that is the distance from the laser range finder to the raw material as the information indicating the particle size distribution of the coarse grains, and wherein the coarse grain particle size distribution calculation unit of the computation device calculates the particle size distribution of the coarse grains on a basis of the profile data of the raw material.

3. The particle size distribution measurement apparatus according to claim 2, wherein the adherent powder measurement device is an image capturing device, the image capturing device capturing an image of the raw material to acquire image data of the raw material captured as the information indicating the particle size distribution of the adherent powder, and wherein the adherent powder particle size distribution calculation unit of the computation device calculates the particle size distribution of the adherent powder on a basis of an average brightness obtained by averaging brightness of each pixel in the image data.

4. The particle size distribution measurement apparatus according to claim 2, wherein the adherent powder measurement device is a spectroscopic device including a spectroscopic measurement unit configured to measure spectral reflectance by dispersing reflected light from the raw material, the spectroscopic device acquiring spectral reflectances at a plurality of wavelengths as the information indicating the particle size distribution of the adherent powder, and wherein the adherent powder particle size distribution calculation unit of the computation device calculates the particle size distribution of the adherent powder on a basis of scores of previously determined basis vectors obtained by applying principal component analysis or partial least squares (PLS) on the spectral reflectances at the plurality of wavelengths.

5. The particle size distribution measurement apparatus according to claim 1, wherein the adherent powder measurement device is an image capturing device, the image capturing device capturing an image of the raw material to acquire image data of the raw material captured as the information indicating the particle size distribution of the adherent powder, and wherein the adherent powder particle size distribution calculation unit of the computation device calculates the particle size distribution of the adherent powder on a basis of an average brightness obtained by averaging brightness of each pixel in the image data.

6. The particle size distribution measurement apparatus according to claim 1, wherein the adherent powder measurement device is a spectroscopic device including a spectroscopic measurement unit configured to measure spectral reflectance by dispersing reflected light from the raw material, the spectroscopic device acquiring spectral reflectances at a plurality of wavelengths as the information indicating the particle size distribution of the adherent powder, and wherein the adherent powder particle size distribution calculation unit of the computation device calculates the particle size distribution of the adherent powder on a basis of scores of previously determined basis vectors obtained by applying principal component analysis or partial least squares (PLS) on the spectral reflectances at the plurality of wavelengths.

7. The particle size distribution measurement apparatus according to claim 1, wherein the coarse grain measurement device and the adherent powder measurement device are arranged above a conveyor for conveying the raw material to a container.

8. The particle size distribution measurement apparatus according to claim 1, wherein the raw material particle size distribution calculation unit of the computation device includes a coarse grain particle size distribution correction unit configured to correct such that the particle size distribution of the coarse grains calculated by the coarse grain particle size distribution calculation unit coincides with the particle size distribution of the coarse grains previously measured using a sieve and a corrected raw material particle size distribution calculation unit configured to calculate the particle size distribution of the raw material on a basis of a particle size distribution of the coarse grains obtained by correcting the particle size distribution of the coarse grains calculated by the coarse grain particle size distribution calculation unit by the coarse grain particle size distribution correction unit and the particle size distribution of the adherent powder calculated by the adherent powder particle size distribution calculation unit.

9. The particle size distribution measurement apparatus according to claim 8, wherein the coarse grain particle size distribution correction unit calculates a difference between the particle size distribution of the coarse grains previously measured using the sieve and the particle size distribution of the coarse grains calculated by the coarse grain particle size distribution calculation unit, the coarse grain particle size distribution correction unit performing the calculation of the difference a plurality of times with respect to the particle size distribution of the coarse grains previously measured using the sieve and the particle size distribution of the coarse grains calculated by the coarse grain particle size distribution calculation unit to calculate an averaged average difference particle size distribution, and using the calculated average difference particle size distribution as a correction value to correct the particle size distribution of the coarse grains calculated by the coarse grain particle size distribution calculation unit.

10. The particle size distribution measurement apparatus according to claim 9, wherein the coarse grain particle size distribution correction unit calculates an average particle size of each of the particle size distribution of the coarse grains previously measured using the sieve and the particle size distribution of the coarse grains corrected by the coarse grain particle size distribution correction unit, the coarse grain particle size distribution correction unit performing the calculation of the average particle size a plurality of times with respect to the particle size distribution of the coarse grains previously measured using the sieve and the particle size distribution of the coarse grains corrected by the coarse grain particle size distribution correction unit to calculate a particle diameter correction factor such that, in results of the calculation of the average particle size performed the plurality of times, the average particle size of the particle size distribution of the coarse grains corrected by the coarse grain particle size distribution correction unit approaches the average particle size of the particle size distribution of the coarse grains previously measured using the sieve, and using the calculated particle diameter correction factor as a correction value to correct the average particle size of the particle size distribution of the coarse grains corrected by the coarse grain particle size distribution correction unit.

11. The particle size distribution measurement apparatus according to claim 8, wherein the coarse grain particle size distribution correction unit calculates an average particle size of each of the particle size distribution of the coarse grains previously measured using the sieve and the particle size distribution of the coarse grains calculated by the coarse grain particle size distribution calculation unit, the coarse grain particle size distribution correction unit performing the calculation of the average particle size a plurality of times with respect to the particle size distribution of the coarse grains previously measured using the sieve and the particle size distribution of the coarse grains calculated by the coarse grain particle size distribution calculation unit to calculate a particle diameter correction factor such that, in results of the calculation of the average particle size performed the plurality of times, the average particle size of the particle size distribution of the coarse grains calculated by the coarse grain particle size distribution calculation unit approaches the average particle size of the particle size distribution of the coarse grains previously measured using the sieve, and using the calculated particle diameter correction factor as a correction value to correct the average particle size of the particle size distribution of the coarse grains calculated by the coarse grain particle size distribution calculation unit.

12. A particle size distribution measurement method for measuring a particle size distribution of a raw material including coarse grains and adherent powder adhering to the coarse grains, the method comprising:
   a coarse grain measurement step of acquiring information indicating a particle size distribution of the coarse grains by a coarse grain measurement device;
   an adherent powder measurement step of acquiring information indicating a particle size distribution of the adherent powder by an adherent powder measurement device; and
   a computation step of calculating the particle size distribution of the raw material by a computation device, wherein the computation step includes a coarse grain particle size distribution calculation step of calculating the particle size distribution of the coarse grains on a basis of the information indicating the particle size distribution of the coarse grains acquired at the coarse grain measurement step, an adherent powder particle size distribution calculation step of calculating the particle size distribution of the adherent powder on a basis of the information indicating the particle size distribution of the adherent powder acquired at the adherent powder measurement step, and a raw material particle size distribution calculation step of calculating the particle size distribution of the raw material on a basis of the particle size distribution of the coarse grains calculated at the coarse grain particle size distribution calculation step and the particle size distribution of the adherent powder calculated at the adherent powder particle size distribution calculation step.

13. The particle size distribution measurement method according to claim 12, wherein the coarse grain measurement device is a laser range finder, in which at the coarse grain measurement step, the laser range finder measures a distance to the raw material to acquire profile data of the raw material that is the distance from the laser range finder to the raw material as the information indicating the particle size distribution of the coarse grains, and at the coarse grain particle size distribution calculation step, the particle size distribution of the coarse grains is calculated on a basis of the profile data of the raw material.

14. The particle size distribution measurement method according to claim 12, wherein the adherent powder measurement device is an image capturing device, in which at the adherent powder measurement step, the image capturing device captures an image of the raw material to acquire image data of the raw material captured as the information indicating the particle size distribution of the adherent powder, and at the adherent powder particle size distribution calculation step, the particle size distribution of the adherent powder is calculated on a basis of an average brightness obtained by averaging brightness of each pixel in the image data.

15. The particle size distribution measurement method according to claim 12, wherein the adherent powder measurement device is a spectroscopic device including a spectroscopic measurement unit configured to measure spectral reflectance by dispersing reflected light from the raw material, in which at the adherent powder measurement step, the spectroscopic device acquires spectral reflectances at a plurality of wavelengths as the information indicating the particle size distribution of the adherent powder, and at the adherent powder particle size distribution calculation step, the particle size distribution of the adherent powder is calculated on a basis of scores of previously determined basis vectors obtained by applying principal component analysis or partial least squares (PLS) on the spectral reflectances at the plurality of wavelengths.

16. The particle size distribution measurement method according to claim 12, wherein the coarse grain measurement device and the adherent powder measurement device are arranged above a conveyor for conveying the raw material to a container.

17. The particle size distribution measurement method according to claim 12, wherein the raw material particle size distribution calculation step includes a coarse grain particle size distribution correction step configured to correct such that the particle size distribution of the coarse grains calculated at the coarse grain particle size distribution calculation step coincides with the particle size distribution of the coarse grains previously measured using a sieve and a corrected raw material particle size distribution calculation step configured to calculate the particle size distribution of the raw material on a basis of a particle size distribution of the coarse grains obtained by correcting the particle size distribution of the coarse grains calculated at the coarse grain particle size distribution calculation step at the coarse grain particle size distribution correction step and the particle size distribution of the adherent powder calculated at the adherent powder particle size distribution calculation step.

18. The particle size distribution measurement method according to claim 17, wherein at the coarse grain particle size distribution correction step, a difference is calculated between the particle size distribution of the coarse grains previously measured using the sieve and the particle size distribution of the coarse grains calculated at the coarse grain particle size distribution calculation step, the calculation of the difference being performed a plurality of times with respect to the particle size distribution of the coarse grains previously measured using the sieve and the particle size distribution of the coarse grains calculated at the coarse grain particle size distribution calculation step to calculate an averaged average difference particle size distribution, and the calculated average difference particle size distribution being used as a correction value to correct the particle size distribution of the coarse grains calculated at the coarse grain particle size distribution calculation step.

19. The particle size distribution measurement method according to claim 18, wherein at the coarse grain particle size distribution correction step, an average particle size of each of the particle size distribution of the coarse grains previously measured using the sieve and the particle size distribution of the coarse grains corrected at the coarse grain particle size distribution correction step is calculated, the calculation of the average particle size being performed a plurality of times with respect to the particle size distribution of the coarse grains previously measured using the sieve and the particle size distribution of the coarse grains corrected at the coarse grain particle size distribution correction step to calculate a particle diameter correction factor such that, in results of the calculation of the average particle size performed the plurality of times, the average particle size of the particle size distribution of the coarse grains corrected at the coarse grain particle size distribution correction step approaches the average particle size of the particle size distribution of the coarse grains previously measured using the sieve, and the calculated particle diameter correction factor being used as a correction value to correct the average particle size of the particle size distribution of the coarse grains corrected at the coarse grain particle size distribution correction step.

20. The particle size distribution measurement method according to claim 17, wherein at the coarse grain particle size distribution correction step, an average particle size of each of the particle size distribution of the coarse grains previously measured using the sieve and the particle size distribution of the coarse grains calculated at the coarse grain particle size distribution calculation step is calculated, the calculation of the average particle size being performed a plurality of times with respect to the particle size distribution of the coarse grains previously measured using the sieve and the particle size distribution of the coarse grains calculated at the coarse grain particle size distribution calculation step to calculate a particle diameter correction factor such that, in results of the calculation of the average particle size performed the plurality of times, the average particle size of the particle size distribution of the coarse grains calculated at the coarse grain particle size distribution calculation step approaches the average particle size of the particle size distribution of the coarse grains previously measured using the sieve, and the calculated particle diameter correction factor being used as a correction value to correct the average particle size of the particle size distribution of the coarse grains calculated at the coarse grain particle size distribution calculation step.

* * * * *